US012422145B2

(12) United States Patent
Cowan et al.

(10) Patent No.: US 12,422,145 B2
(45) Date of Patent: Sep. 23, 2025

(54) APPLIANCE CORNER CAP

(71) Applicant: Midea Group Co., Ltd., Foshan (CN)

(72) Inventors: Richard W. Cowan, Louisville, KY (US); Felix Conde Zelocuatecatl, Louisville, KY (US)

(73) Assignee: MIDEA GROUP CO., LTD., Guangdong (CN)

( * ) Notice: Subject to any disclaimer, the term of this patent is extended or adjusted under 35 U.S.C. 154(b) by 762 days.

(21) Appl. No.: 17/350,498

(22) Filed: Jun. 17, 2021

(65) Prior Publication Data

US 2022/0404027 A1 Dec. 22, 2022

(51) Int. Cl.
*F24C 15/02* (2006.01)
*E05D 15/00* (2006.01)

(52) U.S. Cl.
CPC .............. *F24C 15/02* (2013.01); *E05D 15/00* (2013.01)

(58) Field of Classification Search
CPC ................................ F24C 15/02; E05D 15/00
USPC ......................................................... 126/190
See application file for complete search history.

(56) References Cited

U.S. PATENT DOCUMENTS 1,981,710 A 11/1934 Rix
2,553,922 A 5/1951 Koontz
3,765,400 A * 10/1973 Meier .................. F24C 15/021 126/190
4,196,952 A * 4/1980 Crowe ................. F25D 23/065 312/236
4,383,519 A 5/1983 Katona
4,496,072 A 1/1985 Fleck
4,805,370 A 2/1989 Gerdes
5,819,722 A 10/1998 Katz
7,494,198 B2 * 2/2009 Wing ...................... F16B 12/50 312/265.5
8,859,076 B2 * 10/2014 Carr .......................... F16B 2/14 428/119
9,388,990 B2 * 7/2016 Kim ........................ F24C 15/02
9,671,114 B2 6/2017 Braden et al.
2021/0131171 A1 * 5/2021 Choi ....................... F24C 15/02

FOREIGN PATENT DOCUMENTS

EP 2921784 A1 9/2015
GB 2044918 A 10/1980
JP 2000310089 A * 11/2000
JP 2008308843 A * 12/2008
WO WO2010029083 A1 3/2010

* cited by examiner

*Primary Examiner* — Allen R. B. Schult
*Assistant Examiner* — William C Weinert
(74) *Attorney, Agent, or Firm* — Gray Ice Higdon

(57) ABSTRACT

A sheet panel assembly includes a gap formed in a corner region which is covered with a corner cap member. The corner cap may include various retention mechanisms, such as snaps or spring clips, pin and slots, swaged/flared pins, bendable tabs, and adhesives, to retain the corner cap once installed to cover the gap.

23 Claims, 10 Drawing Sheets

APPLIANCE CORNER CAP

BACKGROUND

The present disclosure relates to a corner cap that covers a gap formed at the corner of a panel (e.g., a door panel) during the fabrication process, and particularly, the disclosed corner cap may be integrated into the exposed corner seams or gaps of various appliances (e.g., a dishwasher door, oven door, microwave door, toaster door, etc.) formed from a sheet panel.

Sheet panels, such as sheet metal panels, are used extensively in manufacturing appliances and furniture. Typically, a door formed from sheet panels has a double panel construction including an outer door panel (also known as a door frame) and a parallel inner door panel. This is particularly popular for cooking appliances, for example, most oven range doors are formed by sheet metal panel fabrications. Such appliances require that the doors be of desired thickness, and to accomplish this, the outer door panel or the door frame usually has its top, bottom, and side edges bent perpendicularly inwardly to engage the inner door panel. This inner door panel forms the inner side of the range door and is spaced a substantial distance from the door frame. Accordingly, an open seam slit or a corner gap may result at each corner of the bent edge flanges of the door frame. Inasmuch as these kitchen appliances are constantly being used by consumers in daily life, it is not aesthetically pleasing. Additionally, sometimes the door may not close properly because the edges of the corner gap are seldom flush with each other and are usually coarse and uneven, leading to improper engagements between the door corner and the engaging surface.

One of the difficult problems during the manufacturing of various composite sheet panel structures, such as the conventional range doors, is how to deal with the corner gaps as described here. While welding is one of the most popular solutions for closing/adjoining the gap, the welding involves special difficulties. For example, welding is not cost-efficient as the weld area must be polished. Further, when a more expensive and higher grade of materials or coatings are applied to guard against corrosion, welding may not be a viable option. For example, welding is not suitable for some stainless steel finishes (e.g., black stainless steel). Due to these difficulties, some manufacturers may simply attempt to close the gap as much as possible during the fabrication process without further treatments. However, the gap remaining at the door corner may tend to grow larger over time, leading to aesthetic degradation and other problems.

Therefore, there is a need to develop a manner and/or apparatus for treating the door corner gaps.

SUMMARY

The present disclosure is directed to an apparatus that covers a corner gap of a door with a flexible or rigid panel part secured over the corner gap without compromising the aesthetic design of the door. Various fastening features (e.g., snaps or spring clips, pin and slots, swaged/flared pins, bendable tabs, etc.) may be provided to permit the cap to be secured to the door corner surface firmly without risk of looseness or displacement, while further easing the installation process. The corner cap can be installed and/or removed by the manufacturers or consumers efficiently and easily, providing ability to replace due to damages and/or per consumer preferences. The corner cap is also in a durable form and has a pleasing appearance. Further, the cost of the disclosed corner cap is low because the material used can be any commonly available material such as metal, plastic, etc., and the manufacturing can be a standard process.

In some embodiments, a door formed from sheet panels may comprise a door frame and a corner cap. The door frame may have a first face opposite a second face and at least one perimeter edge adjoining the first face to the second face around the perimeter. The at least one perimeter edge may have at least one flange turning from the first face toward the second face to form a first edge and a second edge, and a corner gap may be formed by the first edge and the second edge at a corner of the door frame. The corner cap may have a first surface and a second surface, and the second surface may have one or more extensions projecting downwardly therefrom for securing the corner cap on the first edge and/or the second edge of the door frame by abutting the second surface to the first edge and/or the second edge to cover the corner gap.

In some embodiments, a range door formed from sheet panels may comprise a door frame having a four-sided shape and a corner cap. The door frame may have flanges turning rearwardly along its marginal edges to form at least two edges. A corner gap may be formed by the at least two edge at a corner of said door frame. The corner cap may have at least two surfaces, one surface of the at least two surfaces may have extensions projecting downwardly therefrom for securing the corner cap on one edge of the at least two edges of the door frame by abutting the one surface to the one edge to cover the corner gap.

In some other embodiments, a corner cap may be configured to cover a corner gap formed by at least one edge at a corner of a door frame of a door formed from sheet panels. The corner cap may comprise a first surface and a second surface, and the second surface may have one or more extensions projecting downwardly therefrom for securing the corner cap on the at least one edge of the door frame by abutting the second surface to the at least one edge to cover the corner gap.

In still some further embodiments, a door formed from sheet panels may comprise a door frame and a corner cap. The door frame may have a first face opposite a second face and at least one perimeter edge adjoining the first face to the second face around the perimeter. The at least one perimeter edge may have at least one flange turning from the first face toward the second face to form a first edge and a second edge, and a corner gap may be formed by the first edge and the second edge at a corner of the door frame. The corner cap may have a first surface and a second surface and be affixed to the first edge and/or the second edge to cover the corner gap.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above-outlined features are to be understood as exemplary only, and many more features and objectives of the various embodiments may be gleaned from the disclosure herein. Therefore, no limiting interpretation of this summary is to be understood without further review of the entire specification, claims, and drawings included herewith. A more extensive presentation of features, details, utilities, and advantages of the present disclosure is provided in the following written description of various embodiments of the disclosure, illustrated in the accompanying drawings, and defined in the appended claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the disclosure.

DETAILED DESCRIPTION

Figure 1:
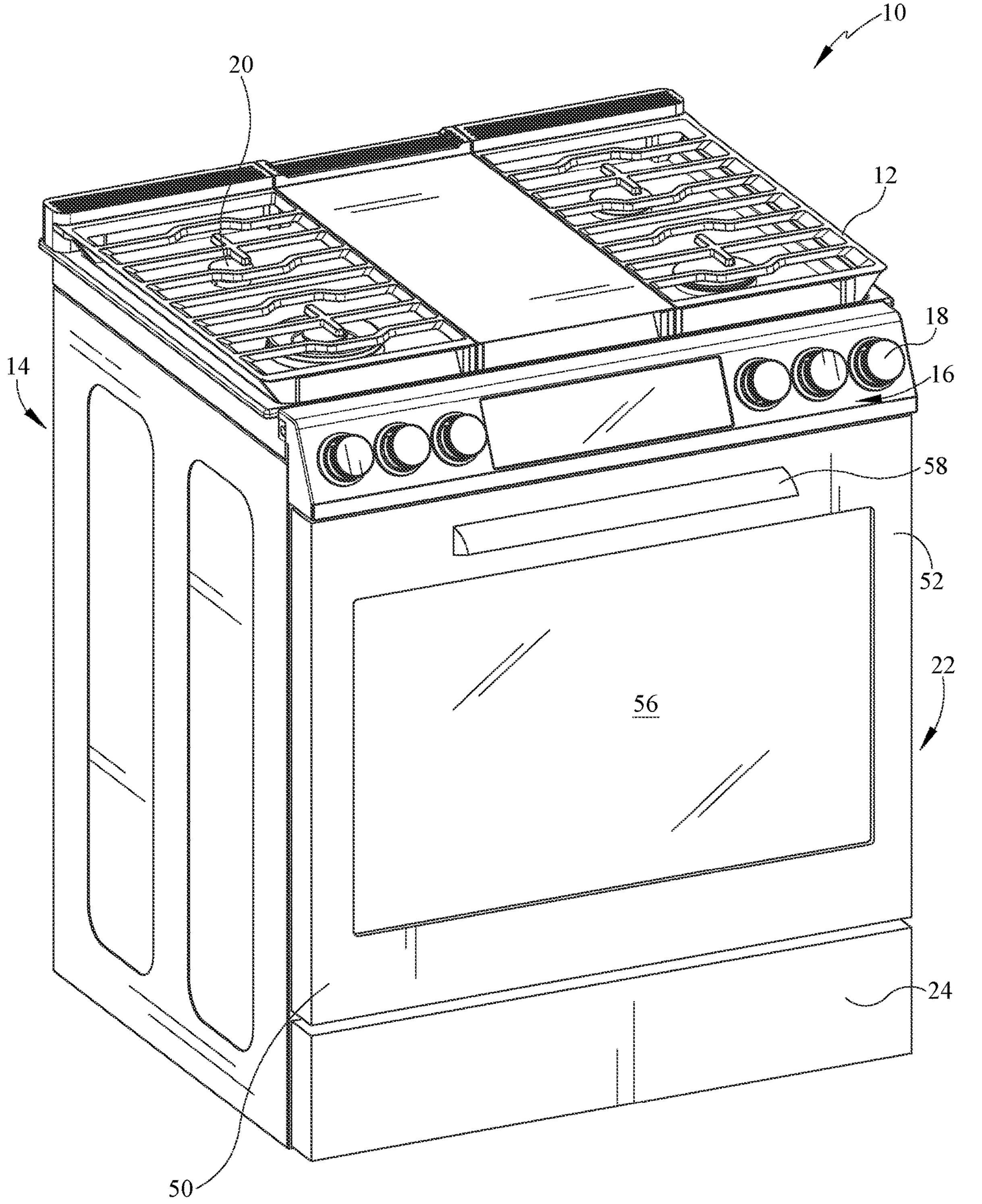
FIG. 1 is a perspective view of a cooking appliance employing one or more door corner caps, with a front door in a vertical closed position, according to an embodiment of the present disclosure.

The disclosure relates to an add-on assembly, a corner cap, for door frame structures of appliances such as stoves or ranges, such as gas ranges, electric ranges, and the like, and the disclosure consists of certain improvements in the form and construction of the range door frame. It is to be understood that a corner cap for covering the door corner gap is not limited in its application to the details of construction and the arrangement of components set forth in the following description or illustrated in the drawings. The described embodiments are capable of other configurations and of being practiced or of being carried out in various ways, for example, the disclosed corner cap may also be used on the furniture doors formed from sheet panels with corner gaps. Also, it is to be understood that the phraseology and terminology used herein is for the purpose of description and should not be regarded as limiting. The use of "including," "comprising," or "having" and variations thereof is meant to encompass the items listed thereafter and equivalents thereof, as well as additional items. Unless limited otherwise, the terms "connected," "coupled," and "mounted," and variations thereof herein, are used broadly and encompass direct and indirect connections, couplings, and mountings. In addition, the terms "connected" and "coupled" and variations thereof are not restricted to direct physical or mechanical connections or couplings.

The embodiments discussed hereinafter will focus on the implementation of the hereinafter-described techniques and apparatuses within a residential cooking appliance, such as a cooking appliance used in single-family or multi-family dwellings, or in other similar applications. It will be appreciated that the herein-described techniques and apparatuses may also be used in connection with other types of cooking appliances in some embodiments. For example, the herein-described techniques may be used in commercial applications. Moreover, the herein-described techniques may be used in connection with various cooking appliance door configurations. Implementation of the herein-described techniques within a gas and/or electric range door, slide-in oven door, freestanding oven door, wall oven door, etc. Moreover, the herein-described apparatus and techniques may be used in connection with other home appliance doors, such as, for example, a dishwasher appliance door.

Turning now to the drawings, wherein like numbers denote like parts throughout the several views, FIG. 1 is a perspective view of a cooking appliance 10 to which the corner cap may be applied according to an embodiment of the present disclosure. As shown in FIG. 1, the cooking appliance 10 may include a cooktop 12 on a top of a housing 14, and the cooking appliance 10 may further include a control panel 16 having a plurality of control knobs or controls 18 for controlling one or more gas and/or electric burners 20 for directly heating a container containing food to cook the food, and/or one or more cooking compartments 22 for heating food accommodated in a cooking chamber by thermal convection, such as a baking oven, convection oven, steam oven, warming drawer and the like, accessible through a door 50 in the front of the housing 14. In the cooking appliance 10 as shown in FIG. 1, the housing 14 may have a single cooking compartment 22. However, some embodiments may have two or more cooking compartments 22. Shelving (not shown) may also be included within the cooking compartment 22. It should be understood that the one or more cooking compartments 22 and/or burners 20 may be heated by gas, electric, hybrid of gas and electric, or combination of heat sources thereof. In some embodiments, the cooking appliance 10 may also include a drawer unit 24 disposed at the lower side of the housing 14 to perform a storage function or a simple cooking function. One application of an embodiment of the cooking appliance 10 may be for a general purpose kitchen oven range.

The door 50 may at least partially define the one or more cooking compartment opening into the cooking compartment 22 and be positionable between an opened position and a closed position. In some embodiments, the door 50 is disposed to be rotatable about a horizontal axis to open and close the cooking compartment 22. In some embodiments, the door 50 may be formed by sheet panels and include a first panel or a door frame 52 and a second panel or internal door panel (not visible in the figures), which form a front external panel and a rear internal panel, respectively. The door frame 52 and the internal door panel form a double wall construction for the door 50 with the two panels substantially parallel to each other. It should be understood that the door 50 may be in a four-sided shape in some embodiments as shown here, while the door 50 may also be in any other suitable shapes/configurations, such as oval, round, etc.

Figure 2:
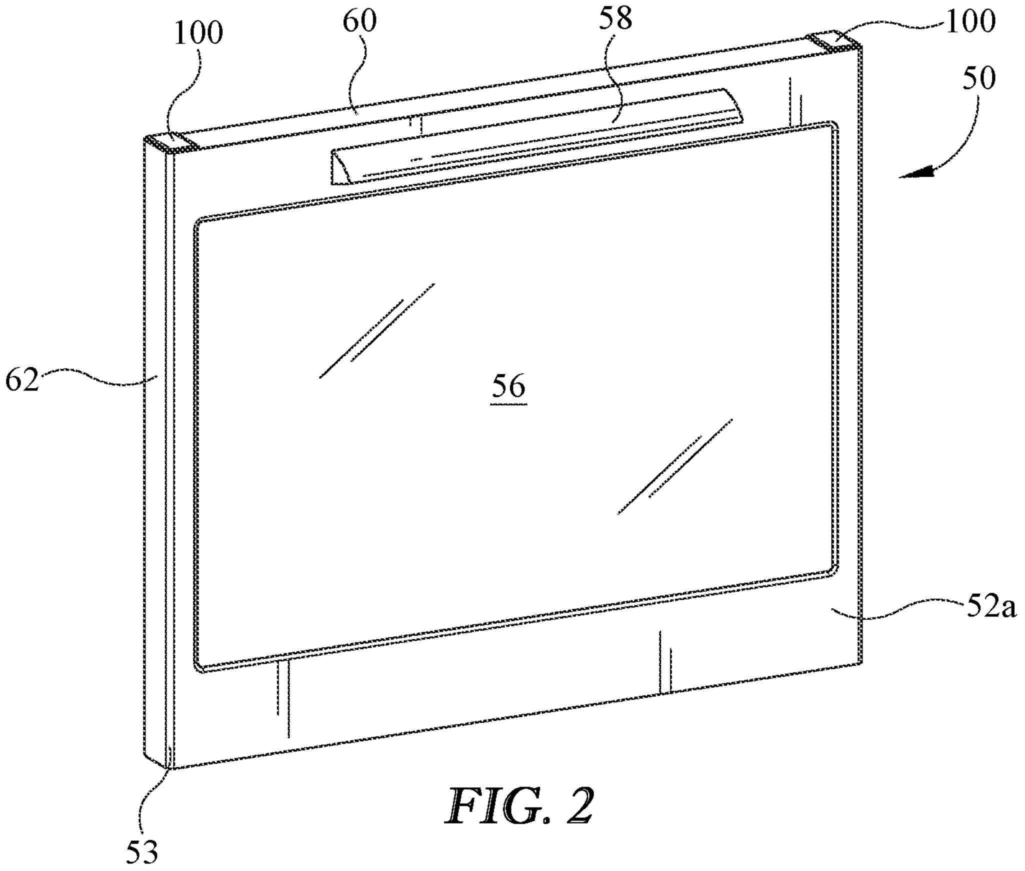
FIG. 2 is a perspective view of the front door of FIG. 1, according to an embodiment of the present disclosure.
Figure 2A:
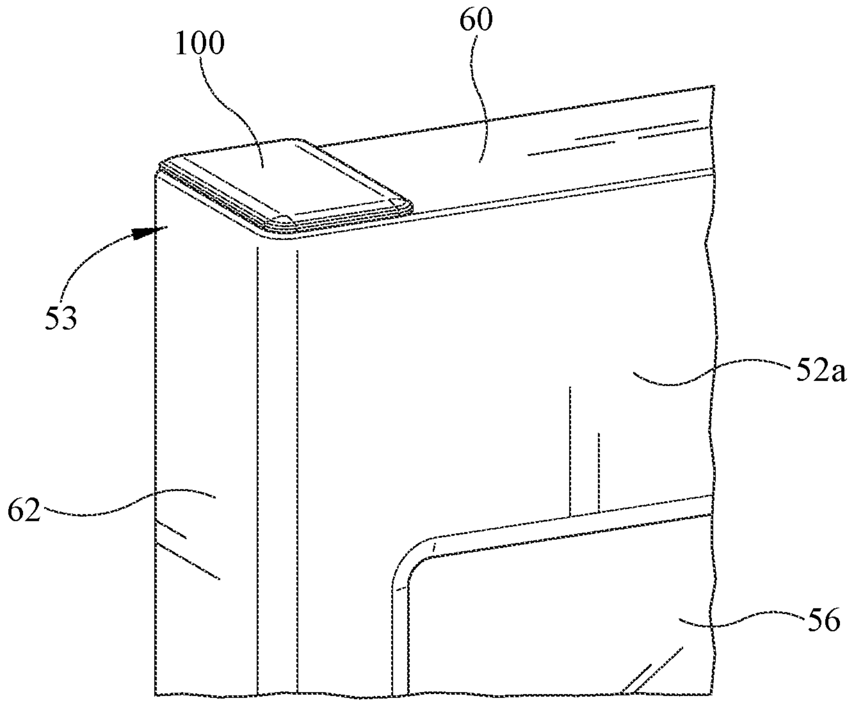
FIG. 2A is a close-up perspective view of a corner cap of FIG. 2, according to an embodiment of the present disclosure.

In some embodiments as shown in FIGS. 1 and 2, the door 50 may include a see-through window 56 to allow a user to see food during cooking. The window 56 may be installed at both the door frame 52 and the internal door panel of the door 50, such that a user can observe the inside of the cooking compartment 22 through the window 56. In some embodiments, a rear see-through window (not visible) installed at the internal door panel and the front see-through window 56 installed at the door frame 52. The rear window may be formed from one or more heat reflective glasses capable of preventing heat leakage by reflecting heat generated in the cooking compartment 22. The front window 56 may be formed from one or more heat resistant tempered glasses so as not to be easily deformed by heat transferred from the cooking compartment 22. In some embodiments, a thermal insulator may be disposed at the border of the see-through window 56 to prevent heat inside the cooking compartment 22 from being transferred into an outer space through the see-through window 56. In some embodiments, a door handle 58 may be installed at a front upper portion of the door frame 52 such that the user can grasp the door handle 58 to open and close the door 50.

In some embodiments as shown in FIGS. 2A and 3A-3D, the door frame 52 may include a first, outer face 52*a* and a second, inner face 52*b* opposite to each other. In some embodiments, the door frame 52 may be formed from a metal material such as stainless steel having high hardness by press processing, with the outer surface 52*a* having a polishing finish appearance. In order to form a shape desired to be finally formed for the door 50, the sheet metal panel of the door frame 52 may be cut in a developed shape, and the border thereof is bent to form at least one edge around the border of the door frame 52. For example, at least one perimeter edge 53 may adjoin the first face 52*a* to the second face 52*b* therearound, and the at least one perimeter edge 53 may have at least one flange turning from its first face 52*a* toward its second face 52*b* to form a first edge 60 and a second edge 62, and a corner seam or gap 80 may be formed by the first edge 60 and the second edge 62 joining each other at a corner of the door frame 52. In embodiments described herein, an overlapping tab 61 may be provided to connect the first edge 60 and the second edge 62. In such embodiments, one or more openings (not shown) may also be provided on the overlapping tab 61 for suitable fasteners to go through to affix the first edge 60 and the second edge 62 together.

Figure 3A:
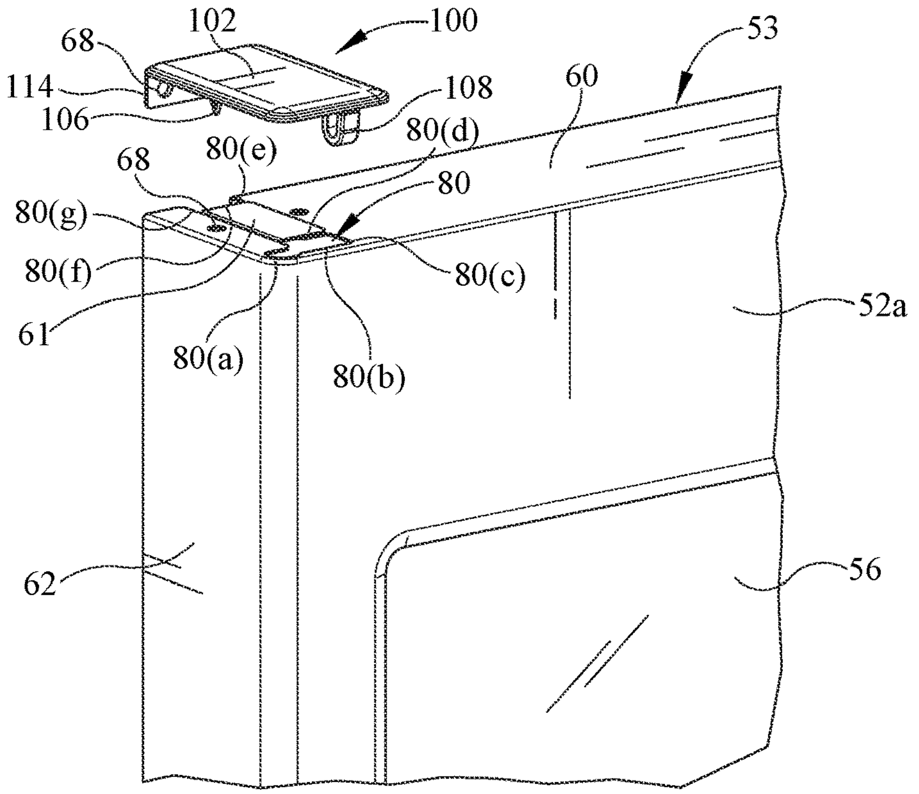
FIG. 3A is a front upper perspective view of an exemplary design of a corner cap before applying to a corner gap, according to an embodiment of the present disclosure.
Figure 6A:
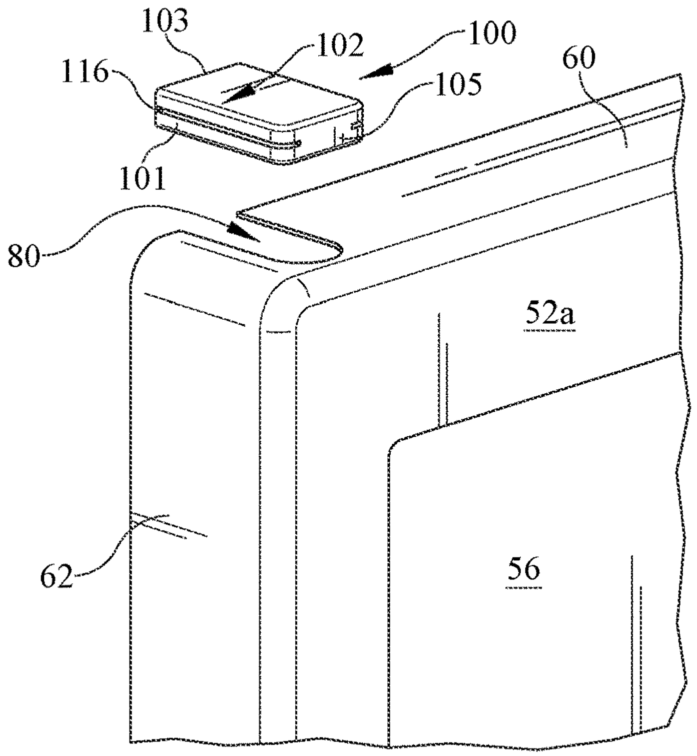
FIG. 6A is a front upper perspective view of a further alternative design of a corner cap before applying to a corner gap, according to an embodiment of the present disclosure.
Figure 7A:
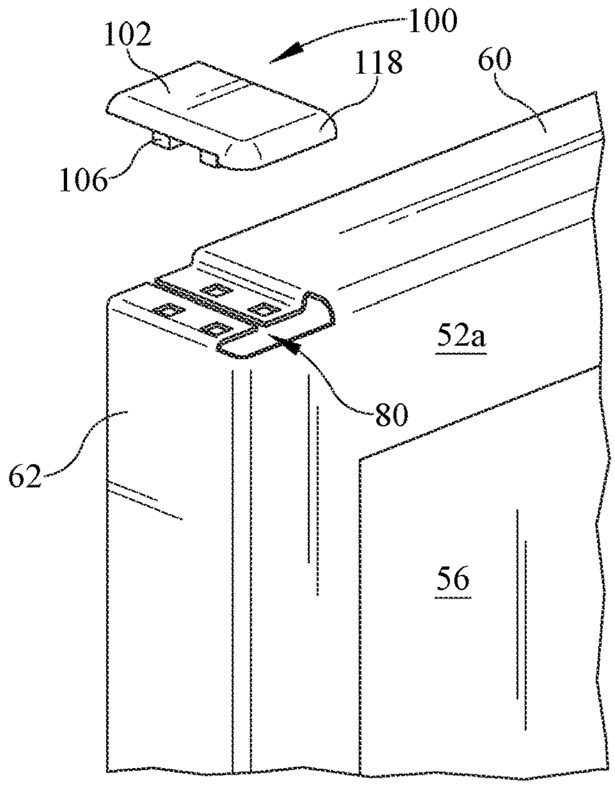
FIG. 7A is a front upper perspective view of a further alternative design of a corner cap before applying to a corner gap, according to an embodiment of the present disclosure.

As shown in FIG. 3A, the gap 80 may be formed on the first, upper edge 60 according to the shape of cutaway portions for preventing the edges from being torn in the fabrication process of the door frame 52. Accordingly, the gap 80 may be formed in various shapes/configurations, sizes, and locations according to these characteristics of the cutaway portions (e.g., the different configurations of the gap 80 as shown in FIGS. 3A, 6A, and 7A). For example, in some embodiments as shown in FIG. 3A, the gap 80 includes a plurality of edge portions 80(*a*), 80(*b*), 80(*c*), 80(*d*), 80(*e*), 80(*f*), and 80(*g*) formed by the first edge 60 and the second edge 62. The plurality of edge portions 80(*a*)-(*g*) may be designed to form any suitable shapes/configurations as long as the shapes/configurations correspond to the cutaway portions. In the illustrated example, the edge portions 80(*b*)-(*g*) are substantially linear portions, while the edge portion 80(*a*) includes a curved transition, which connects the edge portion 80(*b*) and 80(*d*).

Figure 3B:
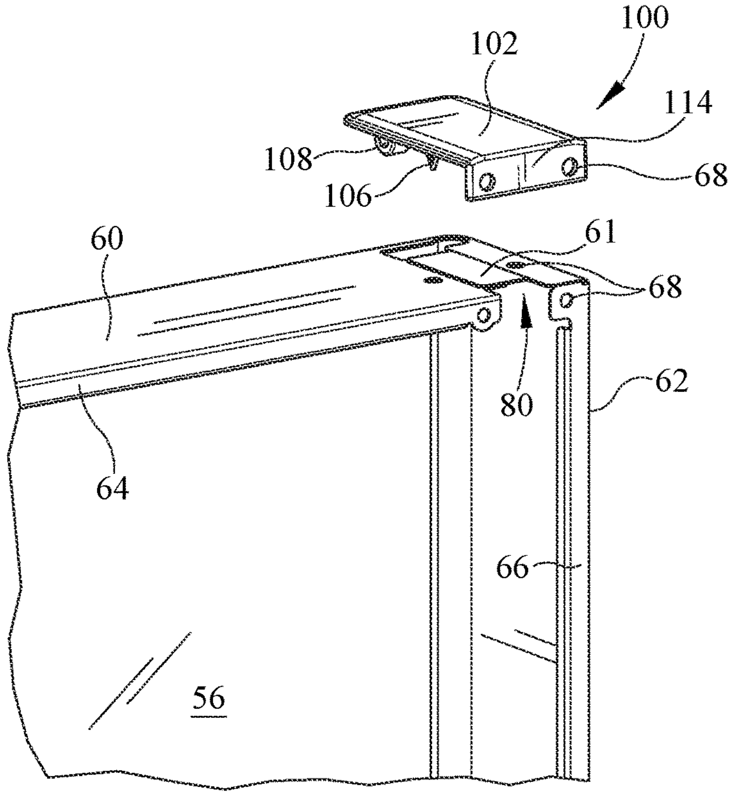
FIG. 3B is a rear upper perspective view of an exemplary design of a corner cap before applying to a corner gap, according to an embodiment of the present disclosure.
Figure 3C:
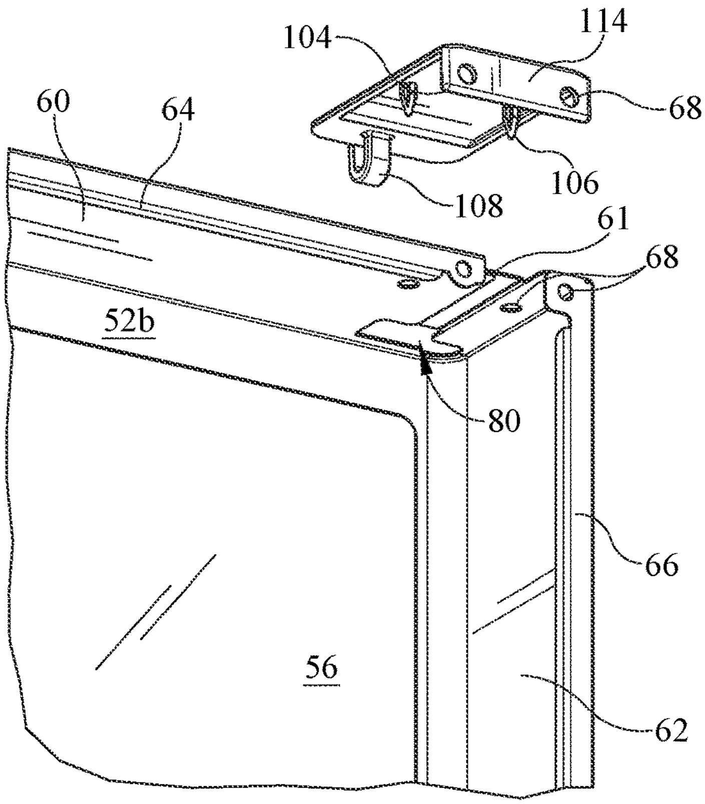
FIG. 3C is a rear bottom perspective view of an exemplary design of a corner cap before applying to a corner gap, according to an embodiment of the present disclosure.
Figure 3D:
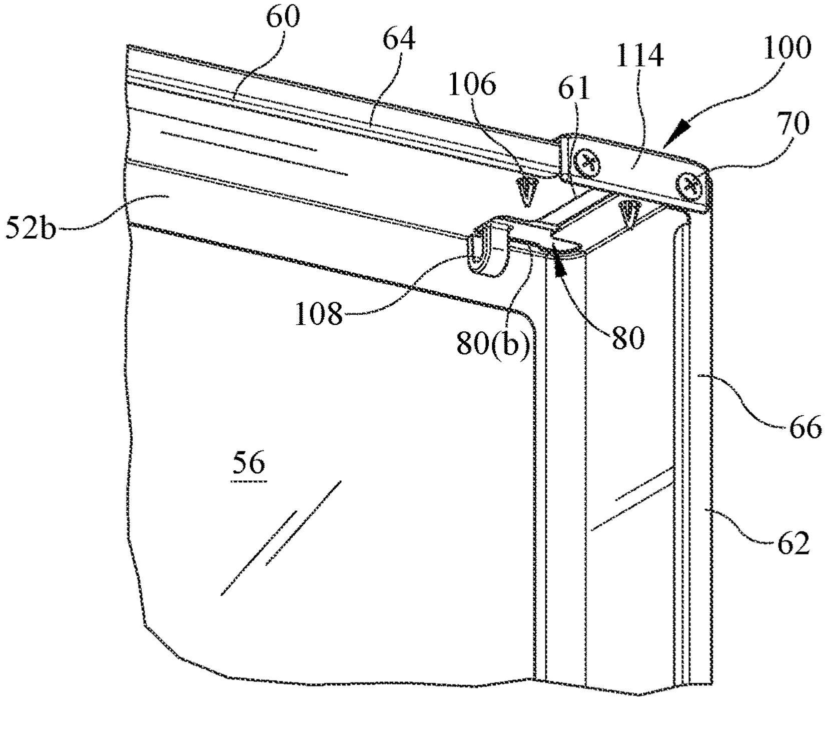
FIG. 3D is a rear bottom perspective view of an exemplary design of a corner cap after applying to a corner gap, according to an embodiment of the present disclosure.

In some embodiments as shown in FIGS. 3A-3D, a corner cap 100 may be in a plate/bracket configuration and include a first surface 102 and a second surface 104, and the second surface 104 may include one or more projections or extensions 106 projecting downwardly therefrom. The one or more extensions 106 may be configured to secure the corner cap 100 on the first edge 60 and/or the second edge 62 of the door frame 52 by abutting the second surface 104 to the first edge 60 and/or the second edge 62 to cover the gap 80. In some embodiments, the one or more extensions 106 projecting downwardly from the second surface 104 of the corner cap 100 may include at least one snap/spring clip 108 configured to clip to the first upper edge 60 and/or the second edge 62 for securing the corner cap 100 on the door frame 52 to cover the gap 80. For example, the at least one snap/spring clip 108 may be configured to clip on the edge portion 80(*b*) with a retention force against a bottom surface of the first edge 60 as indicated in FIG. 3D. In some embodiments, the first edge 60 and the second edge 62 of the door frame 52 may have one or more openings 68 and the one or more extensions 106 may be in a pin configuration for mating with the one or more openings 68 for securing the corner cap 100 on the first edge 62 and/or the second edge 62 of the door frame 52. In some embodiments, the pin 106 may be in a conical/tapered configuration. For example, as shown in FIGS. 3A-3D, the corner cap 100 may include two tapered pins 106 and one snap/spring clip 108, and the cover cap 100 may snap on the given corner gap 80 with a retention force of the spring clip 108, with the tapered pins 106 for locating purposes.

Figure 4A:
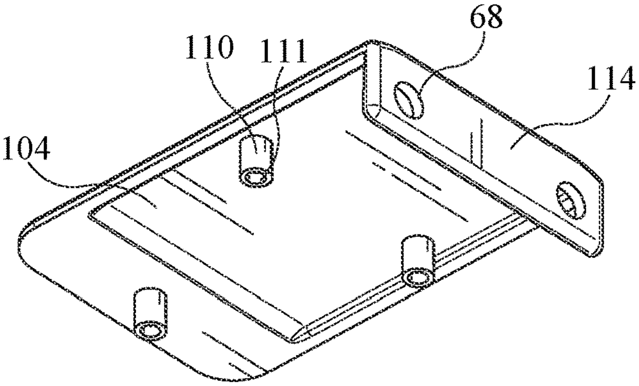
FIG. 4A is a rear bottom perspective view of an alternative design of a corner cap only before applying to a corner gap, according to an embodiment of the present disclosure.
Figure 4B:
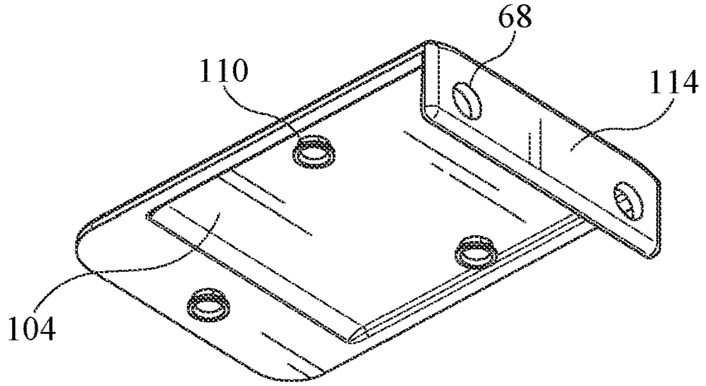
FIG. 4B is a rear bottom perspective view of an alternative design of a corner cap only after applying to a corner gap, according to an embodiment of the present disclosure.
Figure 4C:
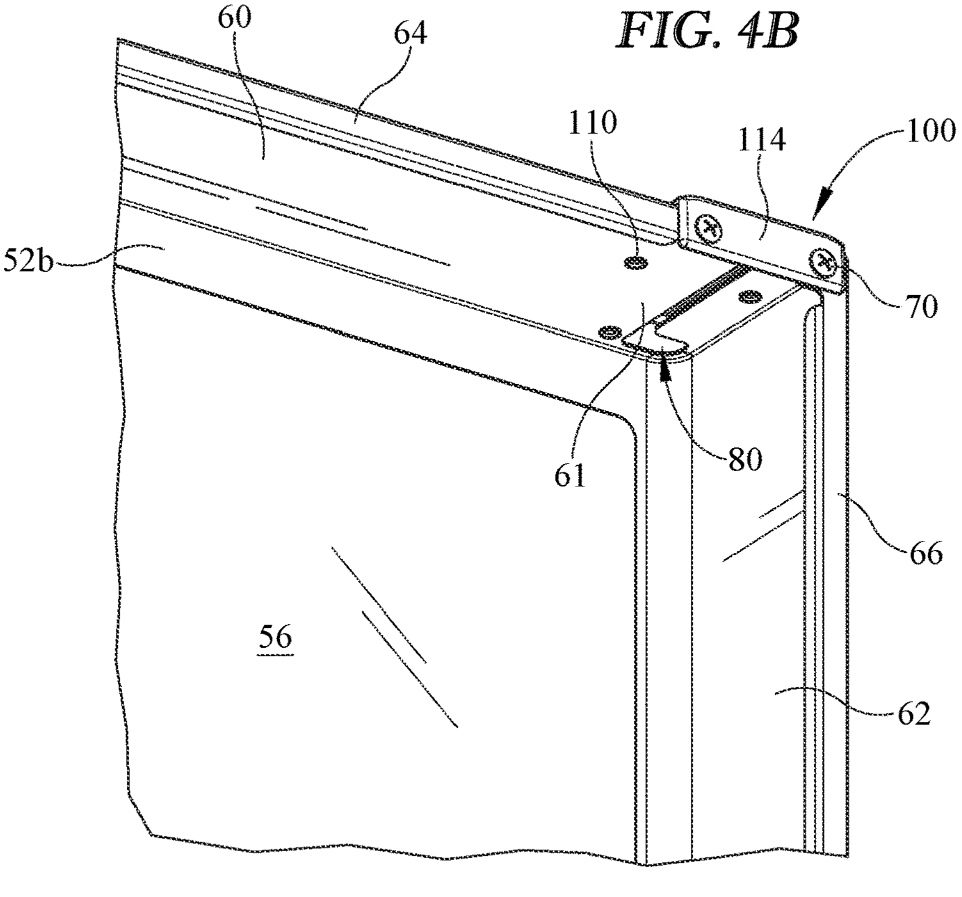
FIG. 4C is a rear bottom perspective view of an alternative design of a corner cap after applying to a corner gap, according to an embodiment of the present disclosure.
Figure 5A:
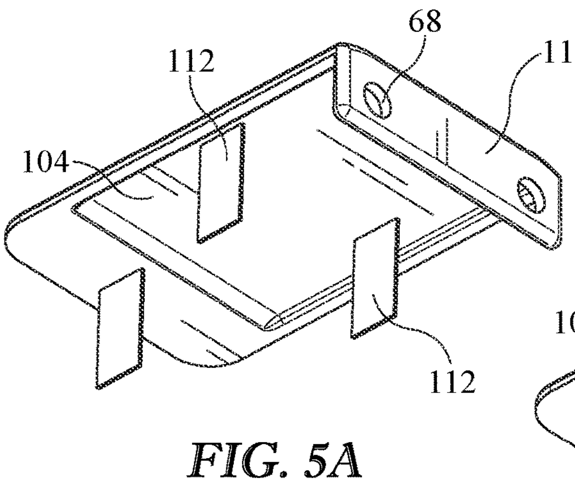
FIG. 5A is a rear bottom perspective view of a further alternative design of a corner cap only before applying to a corner gap, according to an embodiment of the present disclosure.
Figure 5B:
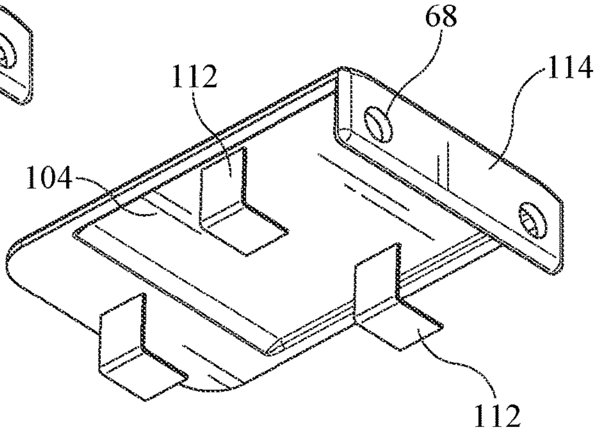
FIG. 5B is a rear bottom perspective view of a further alternative design of a corner cap only after applying to a corner gap, according to an embodiment of the present disclosure.
Figure 5C:
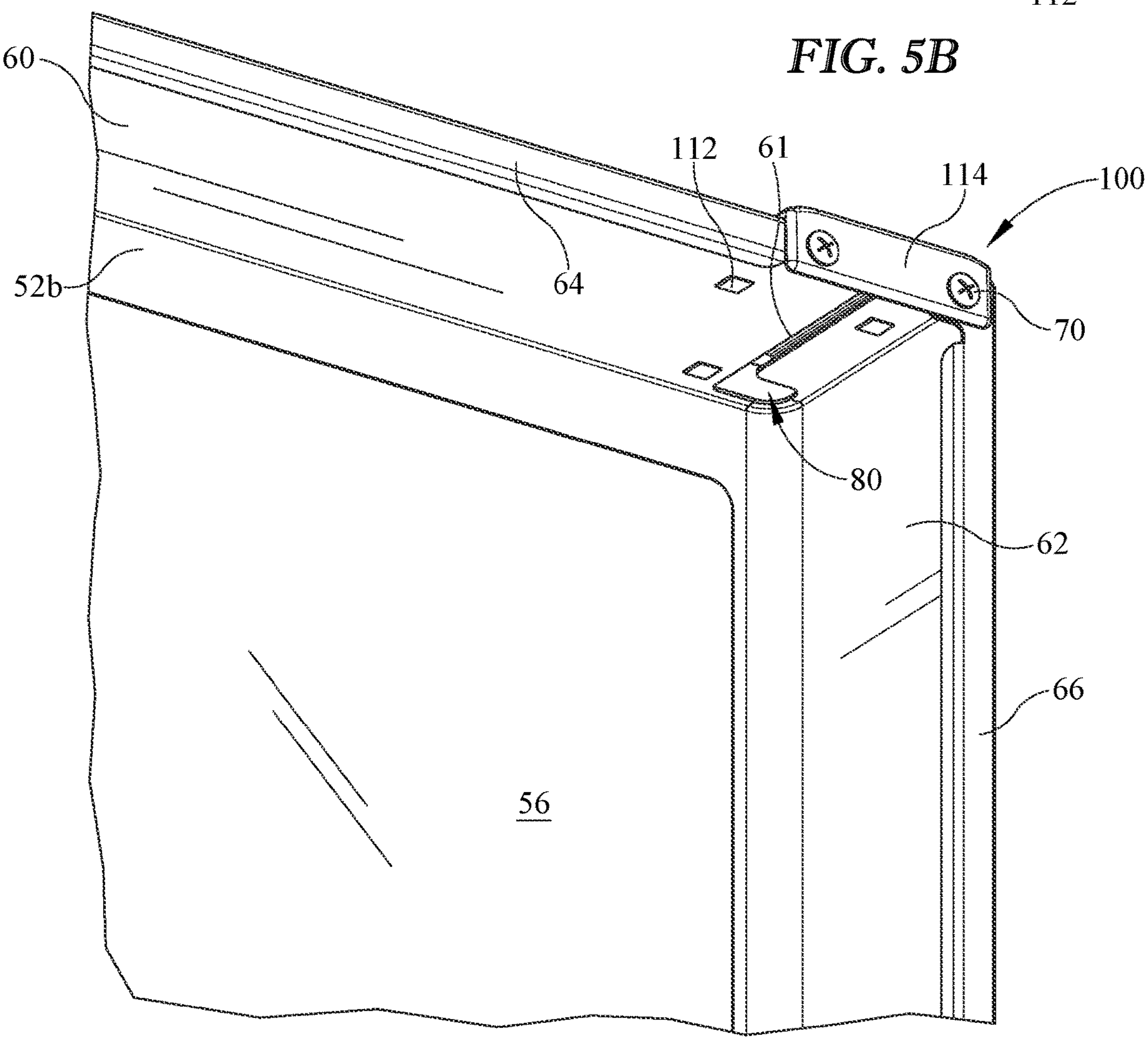
FIG. 5C is a rear bottom perspective view of a further alternative design of a corner cap after applying to a corner gap, according to an embodiment of the present disclosure.

In some other embodiments, the extensions may be slightly hollowed pins that can be mechanically flared on an end opposing from the second surface 104 of the corner cap 100. For example, as shown in FIGS. 4A-C, after the pin 110 inserting through the opening 68, the end 111 of the pin 110 may be flared to a larger diameter to prevent the pin 110 from displacing from the opening 68. In such embodiments, the corner cap 100 may be formed from metal materials for easy swaging. In some other embodiments, the extension may be a tab 112 intended to be inserted through the opening 68 and then bent to prevent movement of the corner cap 100 relative to the door frame 52 as shown in FIGS. 5A-C. In some embodiments, a combination of the snap clip 108 and the flared pin 110 and/or bendable tab 112 may be adapted for a more firmly affixation. For example, the corner cap 100 may include two flared pins 110/bendable tabs 112 and one snap/spring clip 108 in some embodiments. In those embodiments adapting the flared pins 110 and bendable tabs 112, a permanent affixation of the corner cap 100 on the door frame 52 may be achieved as desired. It should be understood that the quantities of the projections or extensions 106 are not limited here. For example, as shown in FIGS. 4A-C and 5A-C. the corner cap 100 may include three flared pins 110 and/or bendable tabs 112. However, more or less flared pins 110 and/or bendable tabs 112 may also be acceptable.

In some embodiments, as best seen in FIGS. 3B-D, each of the first edge 60 and the second edge 62 may include a first lip portion 64 and a second lip portion 66, which are substantially perpendicular to the first edge 60 and the second edge 62, respectively. In such embodiments, the corner cap 100 may further include a third surface 114 for abutting the first lip portion 64 and/or the second lip portion 66. In some embodiments, each of the first lip 64 and the second lip 66 of the door frame 52, and the third surface of the corner cap 100 may also have one or more openings 68 for accommodating one or more fasteners 70. For example, in some embodiments, the one or more fasteners 70 may include one or more screws as shown in FIGS. 3D, 4C, and 5C. It should be understood that the fastener 70 may be any other suitable configurations/mechanisms, such as, a nut combined with a shaft, geometric coupling (e.g., dovetails, tongue and grooves, pin and slots, etc.), and fasteners of many types (e.g., bolts, rivets, pins, ball detents, spring retainers, etc.).

Figure 6B:
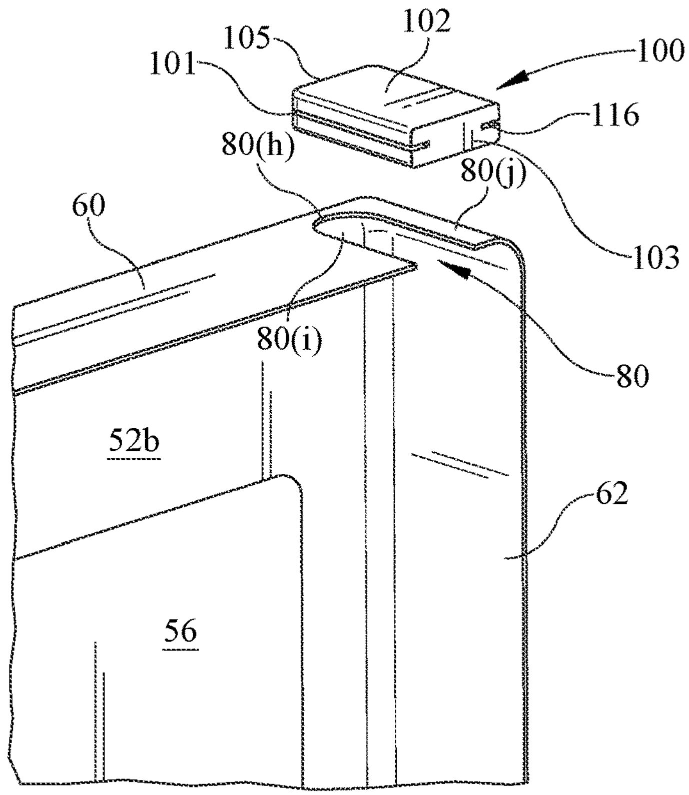
FIG. 6B is a rear upper perspective view of a further alternative design of a corner cap before applying to a corner gap, according to an embodiment of the present disclosure.
Figure 6C:
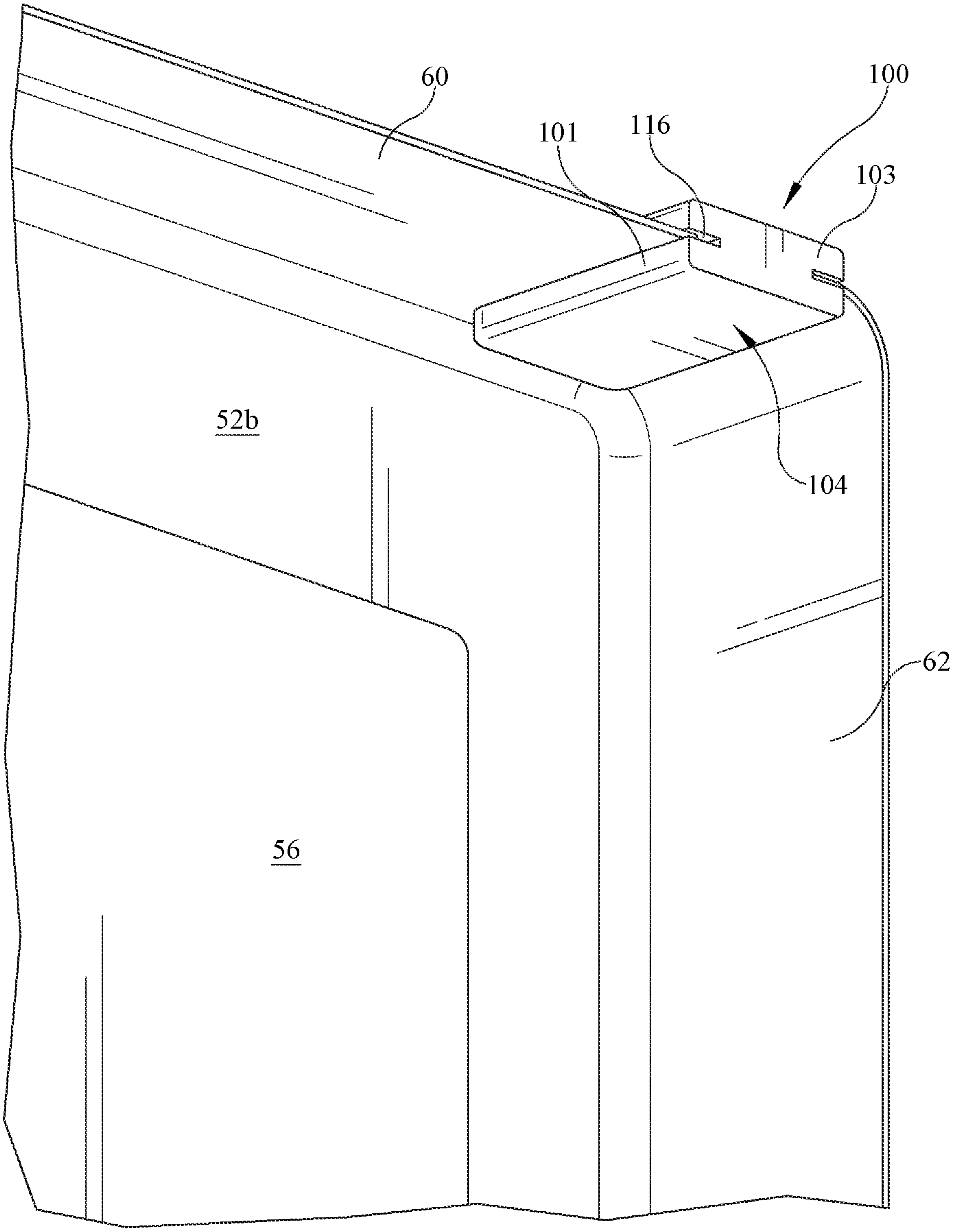
FIG. 6C is a rear bottom perspective view of a further alternative design of a corner cap after applying to a corner gap, according to an embodiment of the present disclosure.

In some embodiments as shown in FIGS. 6A-6C, the corner cap 100 may include a front surface 105, a rear surface 103, and at least one side surface 101. The side surface 101 may include a groove 116 for the first edge 60 and/or the second edge 62 sliding into to cover the gap 80. In such embodiments as shown in FIG. 6B, the gap 80 may include a plurality of edge portions 80(*h*), 80(*i*), and 80(*j*) formed by the first edge 60 and the second edge 62. The edge portions 80(*i*) and 80(*j*) may be substantially linear portions for sliding into the groove 116, while the edge portion 80(*h*) may be a curved transition to connect the edge portion 80(*i*) and 80(*j*). In some embodiments, as best shown in FIG. 6A, the corner connecting the front surface 105 and the side surface 101 may be rounded and also include the groove 106 for receiving the curved edge portion 80(*h*), and the rear surface 103 may be a flat surface with a right-angle corner. It should be understood that any other suitable shapes, configurations, and locations of the side surface 101, the rear surface 103, the front surface 105, and the groove 116 may be accepted here as long as the corner cap 100 can cover the corner gap 80 seamlessly in a sliding manner.

Figure 7B:
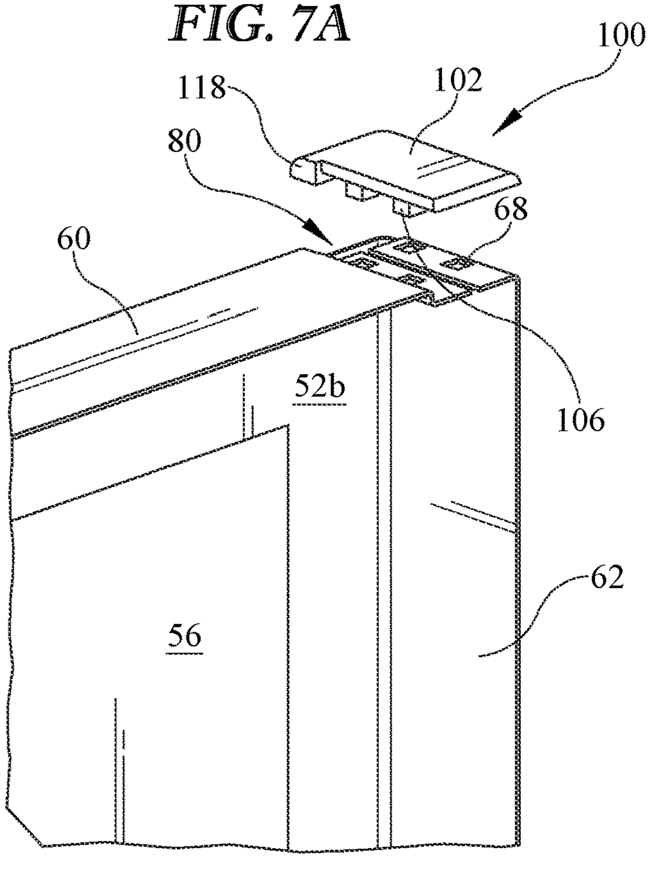
FIG. 7B is a rear upper perspective view of a further alternative design of a corner cap before applying to a corner gap, according to an embodiment of the present disclosure.
Figure 7C:
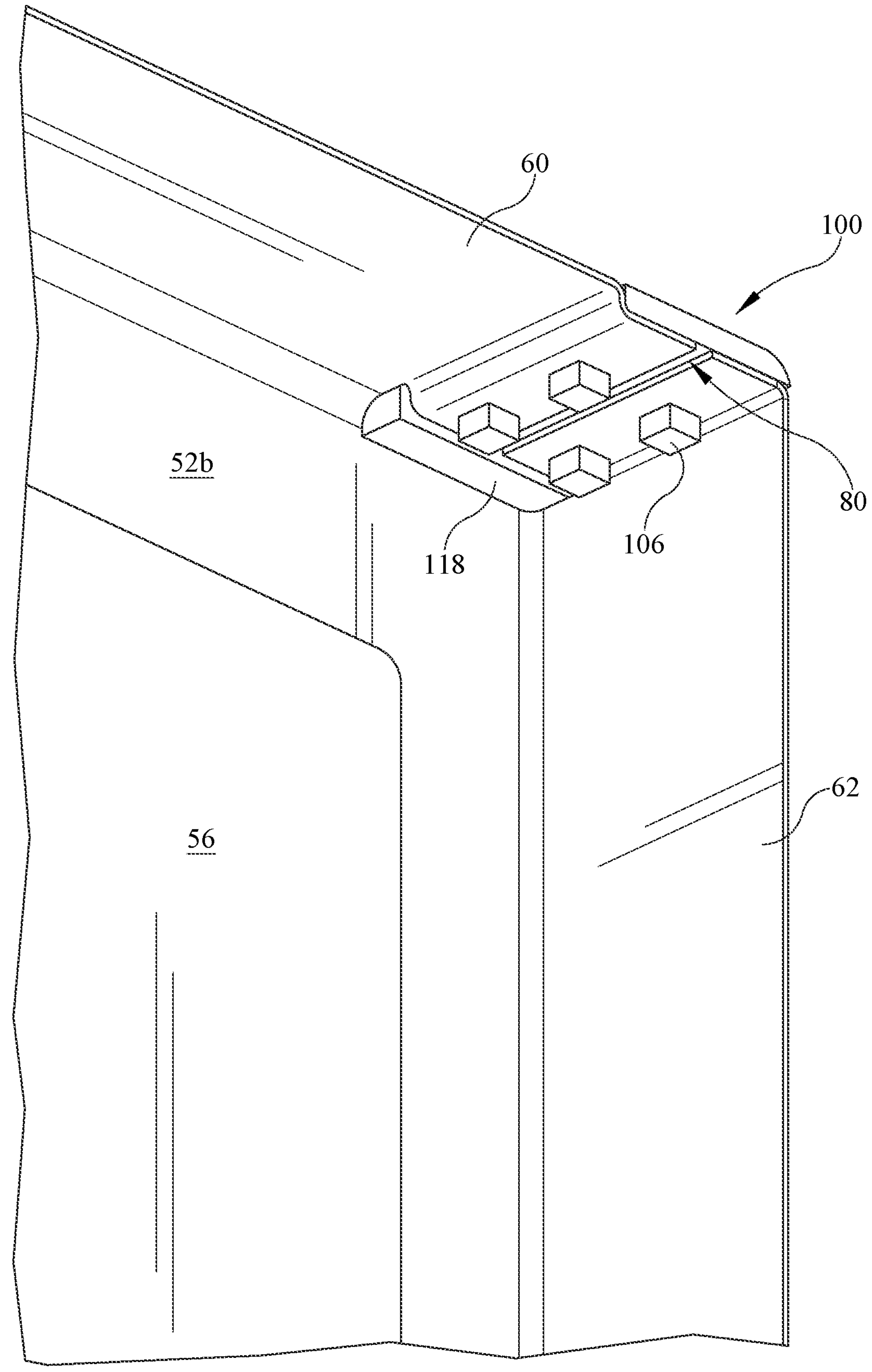
FIG. 7C is a rear bottom perspective view of a further alternative design of a corner cap after applying to a corner gap, according to an embodiment of the present disclosure.

In some embodiments, besides all the affixing manners as described previously, the corner cap 100 may be affixed to the first edge 60 and/or the second edge 62 of the door frame 52 by abutting the second surface 104 to the first edge 60 and/or the second edge 62 by various adhesives to cover the gap 80. For example, as shown in FIGS. 7A-7C, the corner gap 100 may include one or more projections 106 for inserting through one or more openings 68 on the first edge 60 and/or the second edge 62, and a curved third surface 118 for a padding portion to cover the corner gap 80. In such embodiments, the second surface 104 may be applied with various adhesives, such as RTV silicones and double-sided tapes, and adhered to the first edge 60 and/or the second edge 62. It should be understood that the adhesives may be combined with any other affixing manner or applied independently. For example, in some embodiments, the groove 116 as shown in FIGS. 6A-6C may also be applied with various adhesives for better affixation.

In different embodiments, the corner cap 100 may be formed from various materials and applied with various coatings, which may compliment the mounting required and the overall door appearances. For example, the corner cover 100 may be formed from metal (e.g., black steel metal), plastic, or suitable laminate materials to fit the appearance of the door 50. In some embodiments, metal may be preferred as the temperature during the fabrication process of the door frame may be too high for other materials.

In summary, the corner cap 100 may be inserted and coupled to the gap 80 to cover the gap 80 thereby preventing sharp cut surfaces of the cutaway portions from being exposed to the outside, and the corner cap 100 may be formed in any suitable shapes/configurations and sizes corresponding to the gap 80. The corner cap 100 may be mounted to cover the door corner gap 80 with the various mounting options (e.g., screw on, snap on, swaged/flared pins, bendable tabs, etc.), providing the manufacturers or consumers with the ability of easy installation and/or replacement for appearances and damages. In some situations, the corner cover 100 may be removed to access the interior of the door 50 for installing or servicing certain mechanical or electrical components inside (e.g., LED lights, cameras, sensors, etc.). The cover 100 may be positioned at different locations of the door frame 52 to cover the gap 80 at different locations as desired. It should be understood that the disclosed apparatus is not limited to sheet panel doors and may also be used to cover gaps formed in other similar structures. The concept could apply to any product that requires a cosmetic or functional cover applied over a mounting base portion of a given product. It should be understood that the figures only illustrate a representative corner of a door as an embodiment of the disclosure. While only one corner of the door is shown, it should be understood that each of the corners may be constructed in like manner.

In general, it should be understood that some features described above do not constitute limitations of the present disclosure, but rather have only been described for the sake of completeness. Instead, the present disclosure is particularly directed to a range door corner configuration along with a corner gap cap. It should also be understood that the corner cap 100 may be a variety of constructions, shapes, sizes, quantities, and positions but still accomplish the same intent. In various embodiments, the corner cap 100 may be configured to be placed above the sheet panel, being flat with the sheet panel, and/or underneath the metal panel. The corner cap 100 depicted in the accompanying figures may include additional components and that some of the components described in those figures may be removed and/or modified without departing from scopes of the elements disclosed herein. The elements depicted in the figures may not be drawn to scale and thus, the elements may have different sizes and/or configurations other than as shown in the figures.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03. It should be understood that certain expressions and reference signs used in the claims pursuant to Rule 6.2(b) of the Patent Cooperation Treaty ("PCT") do not limit the scope.

What is claimed is:

1. A door formed from sheet panels, comprising:

a door frame having a first face opposite a second face, and at least one perimeter edge adjoining said first face to said second face around the perimeter, said at least one perimeter edge having at least one flange turning from said first face toward said second face to form a top edge and a side edge, wherein said side edge includes a first flange and a second flange perpendicular to said first flange, and said top edge includes a third flange, wherein both said third flange of said top edge and said first flange of said side edge define a top surface of said door frame and said second flange of said side edge defines a side surface of said door frame, and wherein said second flange of said side edge defining said side surface is perpendicular to both said first flange of said side edge and said third flange of said top edge defining said top surface, a corner gap formed within said top surface by said third flange of said top edge and said first flange of said side edge being at a corner of said door frame; and a corner cap having a first surface and a second surface, said second surface having one or more extensions projecting downwardly therefrom for securing said corner cap on said top surface of said door frame by abutting said second surface of said corner cap to both said third flange and said first flange defining said top surface of said door frame to cover said corner gap.

2. The door of claim 1, wherein said one or more extensions include at least one snap clip or spring clip for clipping to said top surface of said top edge and said side edge to secure said corner cap on said top surface of said door frame.

3. The door of claim 1, wherein said top surface includes one or more openings in both said first flange and said third flange in said top surface, and said one or more extensions include at least one first pin for mating with said one or more openings of said first flange in said top surface and at least one second pin for mating with said one or more openings in said third flange in said top surface to secure said corner cap on said top surface of said door frame.

4. The door of claim 3, wherein said at least one pin is in a conical configuration or tapered configuration.

5. The door of claim 3, wherein said at least one pin is hollow and swaged/flared on an end opposing from said second surface thereof.

6. The door of claim 3, wherein said at least one pin is in a bendable tab configuration.

7. The door of claim 1, wherein said top edge and said side edge have flanges turning inwardly along their marginal edges to form a first lip and a second lip respectively, both said first lip and said second lip are in a plane that is perpendicular to both said top surface and said side surface, and said corner cap further includes a third surface for abutting said first lip and said second lip.

8. The door of claim 7, wherein each of said first lip, said second lip, and said third surface has one or more openings for one or more fasteners going through.

9. The door of claim 8, wherein said one or more fasteners include one or more screws.

10. The door of claim 1, wherein the door is a range door.

11. The door of claim 1, wherein said corner cap is formed from metal or plastic.

12. The door of claim 1, wherein an adhesive is applied on said second surface for abutting said second surface to said top surface of both said top edge and said side edge to cover said corner gap.

13. The door of claim 12, wherein said adhesive includes at least one of RTV silicones and/or double-sided tapes.

14. A range door formed from sheet panels, comprising:

a door frame having a four-sided shape, wherein said door frame has flanges turning rearwardly along its marginal edges to form at least two edges, a corner gap formed by said at least two edges being at a corner of said door frame, wherein said at least two edges define a top surface and a side surface between an outer face and an inner face of said door frame, and wherein said corner gap is formed between two flanges in a single plane within said top surface of said door frame and not within said side surface of said door frame; and a corner cap having at least two surfaces, one surface of said at least two surfaces having extensions projecting downwardly therefrom for securing said corner cap on said top surface of said door frame by abutting said one surface to said top surface to cover said corner gap, and wherein said extensions engage an opening in each one of said two flanges of said top surface of said door frame.

15. The range door formed from sheet panels of claim 14, further comprising an overlapping tab connecting said two flanges of said top surface of said door frame.

16. A corner cap configured to cover a corner gap formed by at least one edge at a corner of a door frame of a door formed from sheet panels, comprising:

a first surface and a second surface, said second surface having one or more extensions projecting downwardly therefrom for securing said corner cap on said at least one edge of said door frame by abutting said second surface to said at least one edge to cover said corner gap;

wherein said at least one edge has at least one flange turning inwardly along its marginal edge to form at least one lip, and said corner cap further comprises a plate member having a third surface projecting downwardly from said second surface for abutting said at least one lip, wherein said plate member and said third surface is substantially perpendicular to said first surface and said second surface;

wherein said at least one lip and said third surface have one or more openings for one or more fasteners going therethrough, and wherein said one or more openings of said third surface extend along an axis perpendicular to said one or more extensions and said plate member; and wherein said one or more extensions include at least one snap clip or spring clip for clipping to said at least one edge to secure said corner cap on said at least one edge of said door frame.

17. The corner cap of claim 16, wherein said one or more extensions include at least one pin to secure said corner cap on said at least one edge of said door frame.

18. The corner cap of claim 17, wherein said at least one pin is in a conical configuration or tapered configuration.

19. The corner cap of claim 17, wherein said at least one pin is hollow and swaged/flared on an end opposing from said second surface thereof.

20. The corner cap of claim 17, wherein said at least one pin is in a bendable tab configuration.

21. The corner cap of claim 16, wherein at least one extension of said one or more extensions depends from a first edge of said second surface and said third surface depends from a second edge of said second surface opposite of said first edge.

22. A corner cap configured to cover a corner gap formed by at least one edge at a corner of a door frame of a door formed from sheet panels, comprising:

a first surface and a second surface, said second surface having one or more extensions projecting downwardly therefrom for securing said corner cap on said at least one edge of said door frame by abutting said second surface to said at least one edge to cover said corner gap;

wherein said at least one edge has at least one flange turning inwardly along its marginal edge to form at least one lip, and said corner cap further comprises a plate member having a third surface projecting downwardly from said second surface for abutting said at least one lip, wherein said plate member and said third surface is substantially perpendicular to said first surface and said second surface;

wherein said at least one lip and said third surface have one or more openings for one or more fasteners going therethrough, and wherein said one or more openings of said third surface extend along an axis perpendicular to said one or more extensions and said plate member; and wherein at least one extension of said one or more extensions depends from a first edge of said second surface and said third surface depends from a second edge of said second surface opposite of said first edge.

23. The corner cap of claim 22, wherein said one or more extensions include at least one pin to secure said corner cap on said door frame.

* * * * *